Aug. 5, 1941.    C. J. HARBERT    2,251,829
CERAMIC PIGMENT
Filed July 25, 1939
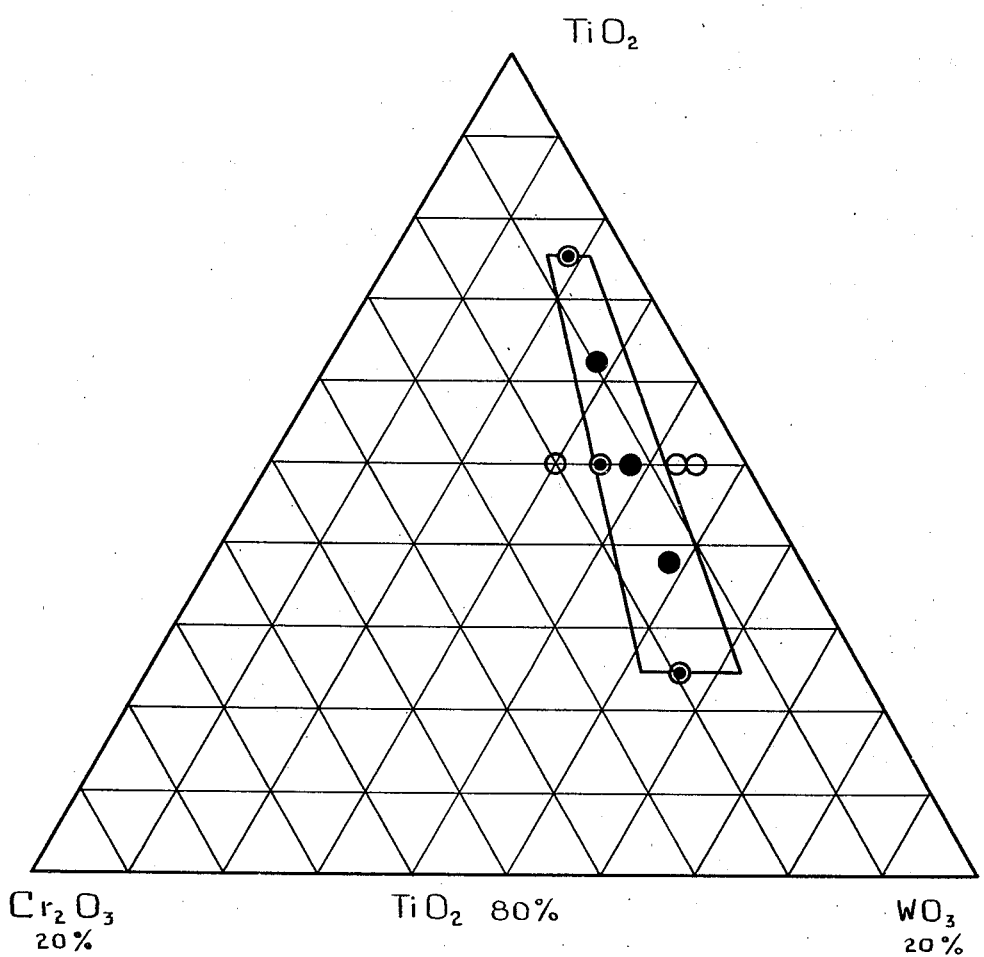
C. J. Harbert   INVENTOR.
BY William H Brown
ATTORNEY.

Patented Aug. 5, 1941

2,251,829

UNITED STATES PATENT OFFICE 2,251,829

CERAMIC PIGMENT

Carl J. Harbert, Shaker Heights, Ohio, assignor to The Harshaw Chemical Company, Elyria, Ohio, a corporation of Ohio Application July 25, 1939, Serial No. 286,394

9 Claims. (Cl. 106—300)

This invention relates to ceramic pigments and has for its principal object to produce a series of new and superior body stains ranging in color from yellow to brown. Of this series, I consider the browns to be more valuable than the yellows because, so far as I am aware, no comparable browns are available. I consider the yellows to be valuable but less valuable than the browns because comparable yellows are available.

I have discovered that within certain rather critical proportion limits, the oxides of chromium, tungsten and titanium yield the desirable colors indicated. Reference is had to the color developed in a ceramic body when the calcined pigment is used as a body stain in the usual manner. The oxides or suitable compounds capable of yielding them on calcination are mixed in suitable proportions and fired whereupon the desired pigments are produced.

The ratio of $Cr_2O_3$ to $WO_3$ is critical within the limits of one mol. $Cr_2O_3$ to from 1 to 3 mols. $WO_3$, the optimum for a brown color being one molecule $Cr_2O_3$ to two mols. $WO_3$. The proportion of titania should be from 85% to 95%, the optimum being 90%, on the basis of the three components named.

In the drawing, the figure is a trilinear diagram indicating these proportions graphically.

Within the limits indicated, the tendency toward brown tends to increase with increase in tungsten up to 2 to 2½ mols. $WO_3$ to each mol. $Cr_2O_3$ and with decrease in titanium to 87½% to 85%.

The indicated oxides or suitable materials capable of yielding them are intimately admixed and calcined at from 1000° C. to 1400° C., the optimum for brown being 1200° C. to 1300° C. Within the temperature limits indicated, the tendency to brown increases with increasing calcination temperatures up to 1300° to 1350° C. The time of calcination may vary from 4 hours to 24 hours at the temperatures indicated, 8 to 12 hours being optimum.

If electropositive oxides or suitable materials capable of yielding them are added to the above described compositions the effect is to produce a tendency toward yellow. Desirable yellows are produced by adding to the desirable browns, before calcination, alkali metal or alkaline earth metal oxides, e. g. CaO or $Na_2O$ in proportion of the order of 1% to 5% of the total.

The described pigments may be added to ceramic body material in any suitable proportions, desirably 5% to 10%.

Example I

|  | Parts by weight |
|---|---|
| $Cr_2O_3$ | 5 |
| $WO_3$ | 15 |
| $TiO_2$ | 180 |

This material was thoroughly mixed wet and fired to 1305° C. for 8 hours in an oxidizing atmosphere. The result was a pleasing red brown color at 5% in tile and a deep leather brown at 10%.

Example II

|  | Parts by weight |
|---|---|
| Chromium tungstate ($Cr_2O_3.2WO_3$) | 20 |
| $TiO_2$ | 180 |

The chromium tungstate was made by coprecipitating chromium sulfate solution and ammonium tungstate solution (excess $NH_4OH$), drying and heating the greenish precipitate to 500° C. to remove ammonium sulfate. The resulting chromium tungstate was mixed with the titania and fired as in Example I. The result was a desirable brown but just slightly less clean than the product of Example I.

Example III

|  | Parts by weight |
|---|---|
| $Cr_2O_3.2WO_3$ | 20 |
| CaO | 10 |
| $TiO_2$ | 170 |

These matrials were mixed and fired as in Example I, yielding a strong deep yellow.

Example IV

|  | Parts by weight |
|---|---|
| $Cr_2O_3$ | 5 |
| $CaWO_4$ | 18.7 |
| $TiO_2$ | 176.5 |

These materials were mixed and fired as in Example I, giving a strong, bright, dark yellow.

Compositions of $Cr_2O_3$, $WO_3$ and $TiO_2$ corresponding to each of the points indicated on the drawings were made up and fired at about 1300° C. Those indicated by empty circles being poor compositions, those indicated by dot circles being fair and those indicated by filled circles being excellent. Compositions within the quadrilateral figure are considered within the scope of the invention.

Optimum compositions were fired at a series of temperatures, giving results as indicated above. Whether the oxides are combined or partially combined in the final pigment or are present in the form of solid solutions or some other physical or physico-chemical combination, I do not know with certainty. Accordingly, in the claims, the pigments will be said to contain the constituent oxides without thereby intending to signify anything concerning the state of association of such oxides in the product. Substantially inert materials having no marked effect other than to dilute the pigment should be excluded in calculating the proportions and compositions coming within the scope of the claims.

Having thus described my invention, what I claim is:

1. Yellow to brown ceramic pigments essentially consisting of the oxides of chromium, tungsten and titanium in the form of a calcination product and in approximately the following proportions:

| | Parts by weight |
|---|---|
| $Cr_2O_3$ | 1 molecule ⎫ 5 to 15 |
| $WO_3$ | 1 to 3 molecules ⎭ |
| $TiO_2$ | 95 to 85 |

2. Yellow to brown pigments containing $TiO_2$ from 85% to 95%, the remaining ingredients being essentially $Cr_2O_3$ and $WO_3$ in relative proportion of approximately 2.3 to 4.6 times as much $WO_3$ as $Cr_2O_3$ by weight and being the product of calcining materials productive of such oxides at a temperature of the order of 1000° C. to 1400° C.

3. A brown body stain containing approximately:

| | Parts by weight |
|---|---|
| $Cr_2O_3$ | 2.5 |
| $WO_3$ | 7.5 |
| $TiO_2$ | 90.0 |

4. A brown body stain containing approximately:

| | Parts by weight |
|---|---|
| $Cr_2O_3$ | 2.5 |
| $WO_3$ | 7.5 |
| $TiO_2$ | 87.5 to 92.5 |

5. A yellow body stain containing approximately:

| | Parts by weight |
|---|---|
| $Cr_2O_3$ | 2.5 |
| $WO_3$ | 7.5 |
| $TiO_2$ | 87.5 to 92.5 | together with not more than 5 parts by weight of one or more oxides of the class consisting of the oxides of alkali metals and alkaline earth metals.

6. A yellow body stain containing approximately:

| | Parts by weight |
|---|---|
| $Cr_2O_3$ | 2.5 |
| $WO_3$ | 7.5 |
| $CaO$ | 5.0 |
| $TiO_2$ | 85 to 95 |

7. A ceramic body of yellow to brown color and containing sufficient amount to produce such coloration of a pigment comprising a calcination product containing the oxides of chromium, tungsten and titanium in approximately the relative proportions:

| | Parts by weight |
|---|---|
| $Cr_2O_3$ | 1 molecule ⎫ 5 to 15 |
| $WO_3$ | 1 to 3 molecules ⎭ |
| $TiO_2$ | 95 to 85 |

8. A ceramic body as set forth in claim 7, further characterized in that said pigment contains an electropositive oxide of the class consisting of the alkali metals and the alkaline earth metals, said electropositive oxide being present in quantity from 1% to 5%.

9. A process of making a ceramic color comprising calcining, at temperatures between 1000° C. and 1400° C., materials capable of producing the following oxides in the proportions indicated:

| | Parts by weight |
|---|---|
| $Cr_2O_3$ | 1 molecule ⎫ 5 to 15 |
| $WO_3$ | 1 to 3 molecules ⎭ |
| $TiO_2$ | 95 to 85 |

CARL J. HARBERT.